FIG. 1.

June 7, 1949.   N. A. MOERMAN   2,472,542
ELECTRONIC TOTALIZING SYSTEM
Filed Jan. 29, 1948   5 Sheets-Sheet 2

FIG. 2.

INVENTOR.
NATHAN A. MOERMAN
BY Alfred W. Barber
ATTORNEY

FIG. 3.

INVENTOR.
NATHAN A. MOERMAN
BY Alfred W. Barber
ATTORNEY

June 7, 1949.    N. A. MOERMAN    2,472,542
ELECTRONIC TOTALIZING SYSTEM
Filed Jan. 29, 1948    5 Sheets-Sheet 4

FIG. 4.

INVENTOR.
NATHAN A. MOERMAN
BY Alfred W. Barber
ATTORNEY

Patented June 7, 1949

2,472,542

UNITED STATES PATENT OFFICE 2,472,542

ELECTRONIC TOTALIZING SYSTEM

Nathan A. Moerman, Brooklyn, N. Y., assignor to Potter Instrument Company, Inc., Flushing, N. Y.

Application January 29, 1948, Serial No. 5,112

7 Claims. (Cl. 235—61)

The present invention concerns electronic totalizing devices.

The term totalizer is used herein to designate devices for adding and indicating the sum of numbers representing various denominations from one or more sources. A simple totalizer would be a device showing the total dollars and cents value of sales made by a sales clerk in a store. A more complicated totalizer would show this for all clerks. A still more complicated totalizer would show partial totals consisting of totals for various departments and a grand total for all departments.

In the past, totalizers or totalizing devices have been largely mechanical, as in the case of an adding machine or a cash register, although some have been electro-mechanical employing such devices as stepping relays. As the complexity of the system grows and as greater speed of operation is required, mechanical or electro-mechanical devices become exceedingly cumbersome and very expensive if, in fact, they are able to meet the requirements at all.

The totalizing devices of the present invention by utilizing electronic devices will operate at almost any required speed and are more simple, cheap and accurate than would be a mechanical or electro-mechanical device. The electronic totalizers to be disclosed in the present application are in part based on totalizers described in the copending patent application entitled "Electronic totalizer," filed on June 14, 1947, and bearing Serial No. 754,635, a totalizing system and a number of variations have been described employing electronic counters, electronic pulse generators, electronic scanners and electronic time delay, lock-out and reset. The electronic counters are electronic devices for counting through the medium of electrical impulses. They are capable of counting to any desired total and are featured by being capable of counting at almost any rate. For instance, counting rates of the order of 100,000 per second are common in electronic counters as against 1 to 10 per second in mechanical counters.

The electronic pulse generators are used to weight the count. A five pulse generator is utilized to give weight of 5 to a given count or operation while a ten denomination is added through the medium of a 10 pulse generator.

The electronic scanners are devices for searching out operations or items to be counted and initiating certain operations upon the detection of an item or operation. In a complex system a large number of scanners may be employed and, in general, they are operated in a predetermined sequence. Where several objects or operations may appear simultaneously, lock-out means may be employed during each scanning sequence. The time delay and resetting device includes circuits for introducing a predetermined time delay at the end of each scanning sequence to permit the operation of relays or other time consuming functions in the system. During the time delay period the system is reset for another scanning sequence and at the end a signal is sent out to the first scanner to start a new scanning sequence.

While the system set forth in the above mentioned application and briefly outlined above has many advantages in speed, accuracy and economy over previously available mechanical and electro-mechanical systems, the present invention concerns still further improvements. The present invention particularly concerns electronic gating applied to totalizing systems of the general type shown and described in the above mentioned application.

One object of the present invention is to provide methods of and means for improved and simplified totalizing by means of electronic methods.

Another object is to provide more accurate electronic totalizing.

Still another object is to provide electronic totalizing which is simplified over prior devices.

A further object is to provide improved electronic totalizing through the application of electronic gates.

These and other objects will be apparent from the detailed description of the invention given in connection with the various figures of the drawing.

Figure 1:
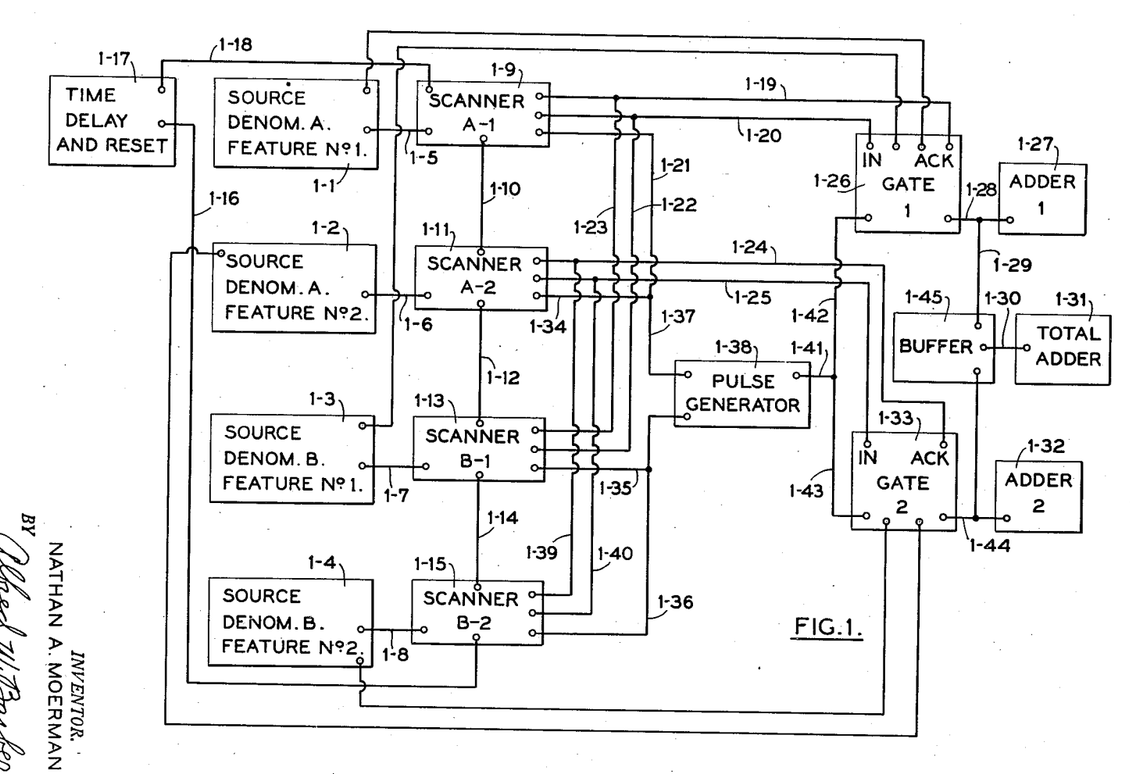
Fig. 1 shows a block diagram illustrating a typical electronic totalizing system according to the present invention.

Fig. 1 shows a typical simple system in block diagram and according to the present invention. This system employs a combination of sources of a plurality of denominations, scanners, a pulse generator, gates, partial and total adders. Two denominations designated A and B are shown together with two features 1 and 2 for each denomination making a total of four sources 1—1, 1—2, 1—3 and 1—4. Associated with the four sources are four scanners, one for each. Scanner 1—9 is connected to source 1—1 by lead 1—5, scanner 1—11 to source 1—2 by lead 1—6, scanner 1—13 to source 1—3 by lead 1—7, and scanner 1—15 to source 1—4 by lead 1—8. The scanners are operated in sequence being connected in series by means of leads 1—10, 1—12, and 1—14. At the end of the scanning sequence a pulse is fed to time delay and reset unit 1—17 over lead 1—16. This unit receives the pulse indicating the completion of the scanning sequence and delays it for a predetermined period to allow time for any mechanical, or other time consuming operations to take place in the system. It then generates a resetting pulse for resetting the system to its initial condition and sends out a pulse over lead 1—18 to the first scanner in the series 1—9 to initiate a new scanning sequence. As each scanner operates in the sequence, it detects a predetermined condition or object to be counted in its associated source. Whenever a scanner detects this condition or object it sends a pulse to pulse generator 1—38 by way of the leads 1—21, 1—34, 1—35 and 1—36. Leads 1—21 and 1—34 both being from scanners of sources of the same denomination enter the pulse generator at a common point and pulses received over this circuit actuate the pulse generator in one mode as, for instance, to cause it to generate two pulses for each pulse received. Similarly leads 1—35 and 1—36 from the scanners of the second denomination enter pulse generator 1—38 together and pulses over this circuit serve to actuate it in a second mode to generate pulses representing the second denomination as, for instance, five. The pulses from the pulse generator are fed to gates 1—26 and 1—33 over common lead 1—41 and branch leads 1—42 and 1—43. Gate 1—26 has the function of allowing only pulses denoting objects or operations in sources of any denomination of feature 1 to pass to adder 1—27 although pulses of all features are impressed from the pulse generator. Gate 1—26 is connected to scanners 1—9 and 1—13, both being of feature 1, by means of leads 1—20 and 1—22 over which a gating pulse is passed whenever the scanner is actuated. Sources 1—1 and 1—3 actuate gate 1—26 by means of pulses passed over leads 1—49 and 1—48 respectively. Similarly gate 1—33 for gating feature 2 is connected to scanners 1—11 and 1—15 by means of leads 1—25 and 1—40 and serves to pass pulses of feature 2 only when actuated by pulses over leads 1—46 and 1—47 respectively. The denomination A or B pulses 2 or 5 are passed to the feature 1 adder 1—27 over lead 1—28 and to total adder 1—31 over lead 1—29 through buffer 1—45 and lead 1—30. Similarly the denomination A or B pulses 2 or 5 pass through gate 1—33 to the feature 2 adder 1—32 over lead 1—44 and to total adder 1—31 through buffer 1—45 and over lead 1—30. Acknowledgement pulses from gate 1—26 are returned to scanners 1—9 and 1—13 over leads 1—19 and 1—23 and from gate 1—33 to scanners 1—11 and 1—15 over leads 1—24 and 1—39.

Thus in operation the pulse generator is actuated to provide pulses representing either denomination A or B depending upon the input point to the pulse generator and the pulses are distributed to the appropriate adder by means of the gates representing features 1 and 2. In a more complex system a single pulse generator can serve for two denominations and a large number of features while a separate gate is required for each feature or partial adder. This represents a considerable reduction in the number of pulse generators required over previous systems and at the same time improved accuracy of operation.

Thus each time a source is activated, pulses are generated by the pulse generator so that one pulse generator may serve a plurality of sources. However, these pulses are only registered on an adder when the gate passes them. A dual value pulse generator can serve a number of sources provided they are confined to one of two denominations. There is a gate for each feature closely associated with the feature adder. Since the pulse generators are major components in the system there is a considerable saving and simplification in the present system over prior systems which required a pulse generator for each source.

Figure 2:
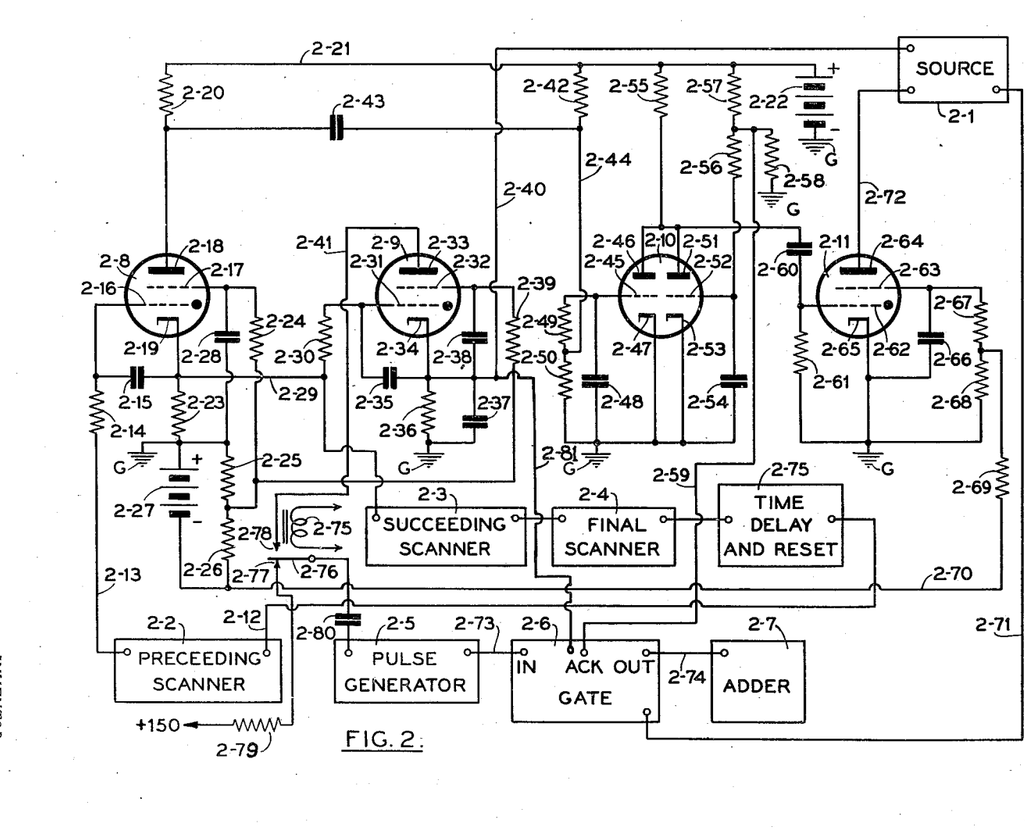
Fig. 2 shows a diagram partly in block diagram with circuit details of the scanner of a typical electronic totalizing system according to the present invention.

Fig. 2 shows detailed circuits of one form of scanner suitable for use in the device of the present invention. This scanner is associated with a source 2—1 and is one in a chain of scanners 2—2, 2—3, and 2—4. This scanner actuates a pulse generator 2—5 which in turn feeds pulses to a gate 2—6 over lead 2—73 and the gate actuates adder 2—7 over lead 2—74 when source 2—1 is in a predetermined condition. When an object or operation to be counted is present in source 2—1 this information is transmitted over lead 2—71 to prime gate 2—6. When gate 2—6 is thus primed it will accept pulses from pulse generator 2—5 and send out an acknowledgement pulse over lead 2—59 to the scanner. Details of the pulse generator and gate are given below in connection with other figures of the drawing. Certain other details of the system as, for instance, the adder will be found in the above mentioned patent applications.

The first tube 2—8 of the scanner shown in Fig. 2 is a thyratron having a cathode 2—19 heated by conventional means, not shown, a control grid electrode 2—16, a second grid 2—17 and a plate 2—18. A scanning impulse is received from preceeding scanner 2—2 over lead 2—13 which passes through resistor 2—14 to control grid 2—16. Capacitor 2—15 is shunted from grid 2—16 to cathode 2—19 to provide a predetermined time delay for this pulse. This input pulse causes thyratron 2—8 to ignite and a pulse is generated due to its cathode current across cathode resistor 2—23 which is passed to the next scanner 2—3 over lead 2—29. If no object or condition to be counted is present in source 2—1 this completes the scanning operation. However, if an object or condition to be counted is present a number of operations take place during the time delay period provided at the input to the next scanner 2—3.

When an object or condition to be counted is present in source 2—1, plate voltage is supplied to plate 2—64 of thyratron 2—11 over lead 2—72. Thyratron 2—11 includes a cathode 2—65 heated by conventional means, not shown, control grid electrode 2—62, second grid 2—63 and plate 2—64. The double triode tube 2—10 includes cathode 2—47 and associated grid 2—45 and plate 2—46 and cathode 2—53 and associated grid 2—52 and plate 2—51. The object or condition to be counted in source 2—1 activates gate 2—6 through a circuit completed by lead 2—71. When gate 2—6 is activated, a pulse is sent over lead 2—59 to grid 2—52 by way of resistor 2—56. This is a negative pulse which overcomes the initial positive bias on grid 2—52 supplied by resistors 2—56, 2—57 and 2—58. Since tube 2—10 has been activated by a pulse from thyratron 2—8 applied to grid 2—45 from plate 2—18 by way of capacitor 2—43 and resistor 2—49 the pulse on grid 2—52 causes a pulse to appear at plate 2—51 which is applied to grid 2—62 over capacitor 2—60. Thus thyratron 2—11 is fired and a pulse from its plate 2—64 passes over lead 2—72 to source 2—1 where it is used to initiate certain desired operations.

When an object or condition to be counted is present in source 2—1, thyratron 2—9 also functions to set off the pulse generator 2—5. The activation of source 2—1 operates relay 2—75 which supplies voltage to plate 2—33 of thyratron 2—9 rendering it in activated condition. Thyratron 2—9 has a cathode 2—34, control element or grid 2—31, screen grid 2—32 and plate 2—23. Cathode 2—34 is connected through cathode resistor 2—36 shunted by by-pass capacitor 2—37 to ground G. Screen 2—32 receives its bias through resistors 2—39 and 2—25 from voltage source 2—27. When thyratron 2—9 has been activated as described above, the scanning pulse generated by the firing of thyratron 2—8 is applied from cathode 2—19 over resistor 2—30 and across capacitor 2—35 to control element 2—31 causing it to fire. The firing of this thyratron 2—9 passes a pulse from plate 2—33 to pulse generator 2—5 causing it to generate the desired number of pulses to represent the denomination of source 2—1. These pulses pass through gate 2—6, which is opened by a pulse from a cathode 2—34 over lead 2—81 and the circuit completed from source 2—1 over lead 2—71, to the adder 2—7 where they are counted. During the period while relay coil 2—75 is deactivated, capacitor 2—80 is charged from a source of voltage through resistor 2—79 and contacts 2—76 and 2—77. When source 2—1 is activated relay coil 2—75 is energized and movable contact 2—76 is pulled up to contact 2—78 energizing plate 2—33 from capacitor 2—80 over lead 2—41.

Since the scanning system comprises a plurality of thyratron tubes in series or cascade, if one fails to fire the scanning process is stopped. The stoppage of the scanning may be detected when a neon lamp in the time delay and reset unit shown in Fig. 5 fails to flash regularly.

The acknowledgement pulse to source 2—1 over lead 2—72, as described above, depends upon coincidence of voltage supplied from operation of the scanner stages and a pulse from pulse generator 2—5 supplied by way of gate 2—6 over lead 2—59.

Figure 3:
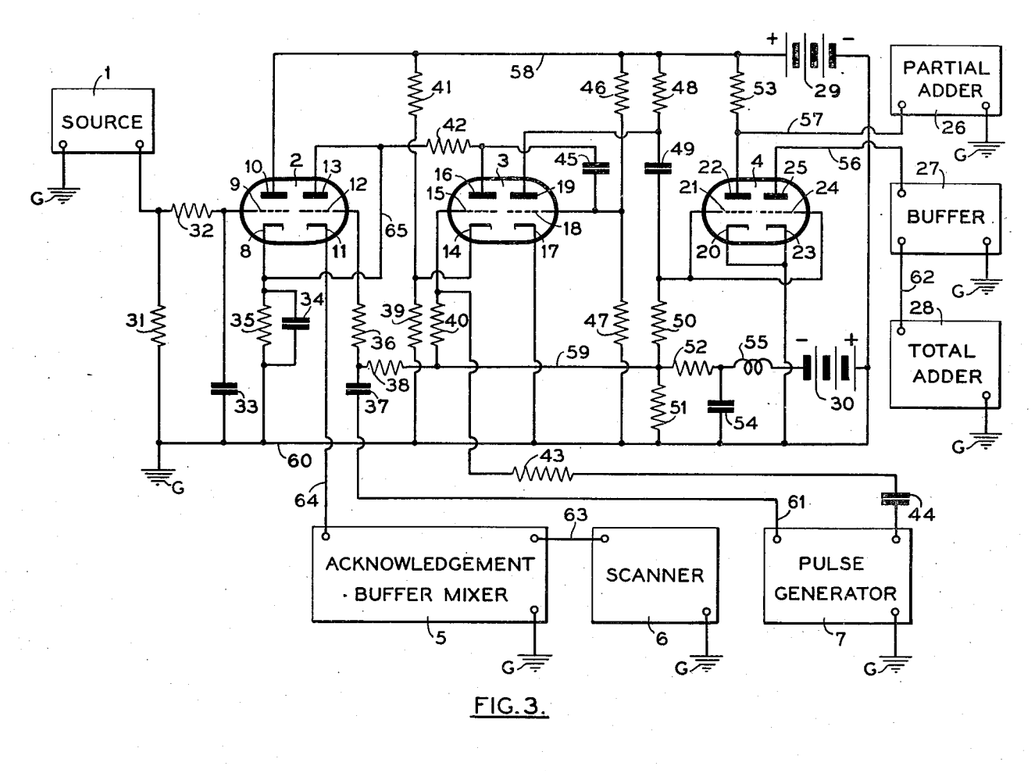
Fig. 3 shows a diagram partly in block diagram with circuit details of the gate of a typical electronic totalizing system according to the present invention.

Fig. 3 shows a typical circuit of a "gate" suitable for operation as a part of the present invention. By using a gate, a single pulse generator serves a large number of sources which otherwise would each require a pulse generator. Since the gates are considerably simpler than the pulse generators, a great saving in tubes and circuits is accomplished.

In detail Fig. 3 shows a source 1 connected to control tube 2 through resistor 32 and across capacitor 33 and grid resistor 31. Resistor 32 acting with capacitor 33 forms a filter to remove noise and other undesired components from the pulse from source 1. Control tube 2 comprises two thermionic vacuum tubes including cathode 8, grid 9 and plate 10 and cathode 11, grid 12 and plate 13. Between cathode 8 and ground lead 60 is connected capacitor 34 shunted by resistor 35. Resistor 35 has a high value and acts merely to slowly discharge capacitor 34. When a pulse is received at grid 9 from source 1 in a positive direction, current to plate 10 flows from a suitable plate voltage source such as battery 29 through the first triode section to cathode 8 and charges capacitor 34. The second tube 3 serves the gating function to pass pulses from pulse generator 7 received through capacitor 44 and resistor 43 and passed on through the buffer mixer tube 4 to partial adder 26 and total adder 28. Tube 3 includes a first section including cathode 14, control grid 15 and plate 16 and a second section including cathode 17, control grid 18 and plate 19. Cathode 14 of the first section is held at a positive bias point by its connection to the junction between resistors 39 and 41 which in turn are connected between positive voltage lead 58 and ground lead 60. Grid 15 receives a negative bias from a suitable source such as battery 30 by its connection through resistors 40 and 52 and inductor 55. Plate 16 is energized from capacitor 34 through resistor 42. Thus, with capacitor 34 charged as described above, the first section of tube 3 is activated by the application of plate voltage and pulses from pulse generator 7 are passed to grid 18 of the second section through capacitor 45 and across grid resistor 47. The second section of tube 3 acts as an amplifier since cathode 17 is connected to ground lead 60 and plate 19 is energized through plate load resistor 48 from positive lead 58. Amplified pulses from plate 19 appearing across load resistor 48 are applied to grid 21 of the first section of buffer-mixer tube 4 through coupling capacitor 49 and across grid resistor 50. The buffer-mixer tube 4 has two sections, a first section including cathode 20, grid 21 and plate 22 and a second section including cathode 23, grid 24, and plate 25. Cathodes 20 and 23 are connected to ground lead 60. Both grids 21 and 24 are connected to grid resistor 50 receiving a negative bias from battery 30 through resistor 52 and inductor 55. Thus both grids 21 and 24 receive the amplified pulses from pulse generator 7 through the second section of tube 3. The first section has its plate 22 connected to positive lead 58 through load resistor 53 and delivers amplified pulses from plate 22 over lead 57 to partial adder 26 where they are counted. These same pulses amplified by the second section of tube 4 are applied to buffer 27 over lead 56 and from there over lead 62 to total adder 28 where they are added to the total count. Scanner 6 is the scanner corresponding to source 1 and it is connected to the acknowledgment buffer mixer 5 by lead 63. When pulse generator 7 has generated its required number of pulses, it generates a pulse which is applied over lead 61 through capacitor 37 and resistor 36 to grid 12 of the second section of control tube 2. This pulse on grid 12 causes plate 13 to draw current and by means of its connection over lead 65 to discharge capacitor 34. With capacitor 34 discharged the gate is deactivated and cannot pass pulses until a new activating pulse is received from source 1.

Conduction in the second section of tube 2 due to the pulse from pulse generator 7 also causes current to flow to cathode 11 over lead 64 to buffer-mixer 5 which is termed an acknowledgment pulse.

Figure 4:
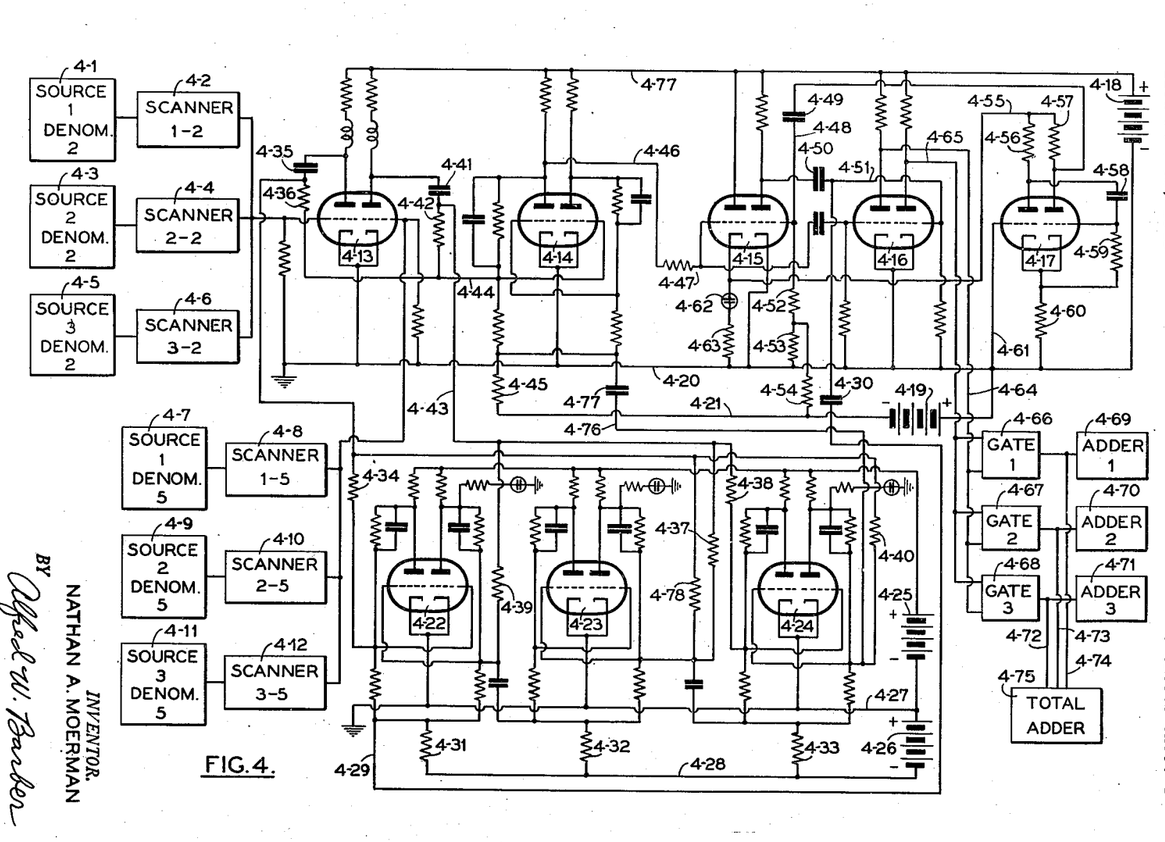
Fig. 4 shows a diagram partly in block diagram with circuit details of the pulse generator of a typical electronic totalizing system according to the present invention.

Fig. 4 shows in detail the circuits of a pulse generator for generating either 2 or 5 pulses. Double triode tubes 4—22, 4—23 and 4—24 are connected to form a binary counter of three stages normally counting to 8 as described in detail in the above referred to application. Tube 4—13 is the input coupling tube which receives pulses and feeds them into the counter in such a manner as to preset either 6 or 3 counts so that either 2 or 5 more pulses will fill the counter. Tube 4—17 is connected to act as an oscillator when energized by switch tube 4—14 through gate buffer tube 4—15. Tube 4—16 is an output buffer tube for feeding out the counted pulses and an acknowledgment pulse to the gates (shown in detail in Fig. 3).

To set forth these circuits in more detail oscillator tube 4—17 comprises two triode sections which may conveniently be in the form of a double triode as shown. The cathodes are connected to ground through a common resistor 4—60, one grid is connected to ground through lead 4—61 while the other grid is connected to the junction between capacitor 4—58 which is connected in series with resistor 4—59 between the plate associated with the first grid and the cathodes. The plates are connected through separate resistors 4—56 and 4—57 over common lead 4—55 to the left cathode of gate buffer tube 4—15 which when activated supplies plate voltage. Tube 4—17 oscillates with the above connections and at a frequency determined by the capacitor and resistor values. While the frequency is not critical it has been found that a frequency between 1000 and 2000 cycles is quite satisfactory. Oscillator tube 4—17 is activated by supplying it with plate voltage from the left side cathode of gate buffer tube 4—15 and when the required number of pulses have been generated it is turned off as will be described below.

Switch tube 4—14 is provided to turn the oscillator on and off. Initially its left side plate draws current and hence the voltage of this plate is relatively low. Its right side plate is initially at or near cut-off and hence at a relatively high voltage. When a scanner pulse is received by either grid of input tube 4—13 a positive pulse is produced at either plate both of which are coupled through capacitors 4—35 and 4—41 and resistors 4—36 and 4—42 to the right side grid of tube 4—41. This positive pulse causes the current to switch from the left side to the right side plate of switch tube 4—14. When this switch takes place, the voltage of the left side plate rises and supplies a positive voltage to the left side grid of gate buffer tube 4—15 over lead 4—46 and through resistor 4—47. This positive voltage on the left side grid causes the left side cathode voltage to rise to a high value supplying plate voltage to tube 4—17 causing it to oscillate. The generated oscillations are applied to the right side grid of gate buffer tube 4—15 through capacitor 4—49 and over lead 4—48. The resulting oscillator signal pulses on the right side plate of tube 4—15 are applied to the input to the first counter tube 4—22 through capacitor 4—30 and over lead 4—29 where these pulses are counted. These right side plate pulses of tube 4—15 are also applied to the right side grid of output buffer tube 4—16 and the resulting right side plate pulses are applied to the input of gates 4—66, 4—67 and 4—68 over lead 4—65.

Initially the right sides of counter tubes 4—22, 4—23 and 4—24 are conducting and the corresponding plate right said plate voltages are relatively low. This counter will normally count to 7 and on the 8th count revert to its initial condition. In order to obtain counts of less than 8 a count is set into the counter before it starts to count the oscillator pulses. In order to obtain a count of 5 an initial count of 3 is set into the counter and to obtain a count of 2 an initial count of 6 is set into the counter. Scanners 4—8, 4—10, and 4—12 are connected to corresponding sources 4—7, 4—9 and 4—11 all of denomination 5. Pulses generated by any one of these scanners is to generate 5 pulses representing the denomination of 5 and hence are to set counts of 3 into the counter. The outputs of these scanners are applied to the right side grid of input tube 4—13 and the resulting right side plate pulses are applied through capacitor 4—41 over lead 4—43 and through resistor 4—39 to left side grid of first counter tube 4—22, through resistor 4—78 to the left side grid of second counter tube 4—23, and through resistor 4—38 to the right side grid of third counter tube 4—24. The pulses thus applied to the counter tubes cause the plate current of the first counter tube to shift to the left side, of the second counter tube to shift to the left side and of the third counter tube to hold on the right side. These conditions correspond to a count of 3 in the counter and hence when 5 pulses are received from the oscillator the counter fills. When the counter fills the plate current shifts from the left side to the right side of third counter tube 4—24 and the resulting pulse is applied to the left side grid of switch tube 4—14 over lead 4—76 and through capacitor 4—77 where it shifts the plate current of the left side to rise dropping the corresponding plate voltage and the left side grid voltage of tube 4—15. This drops the left side cathode voltage of tube 4—15 removing the oscillator plate voltage turning the oscillator off.

Figure 5:
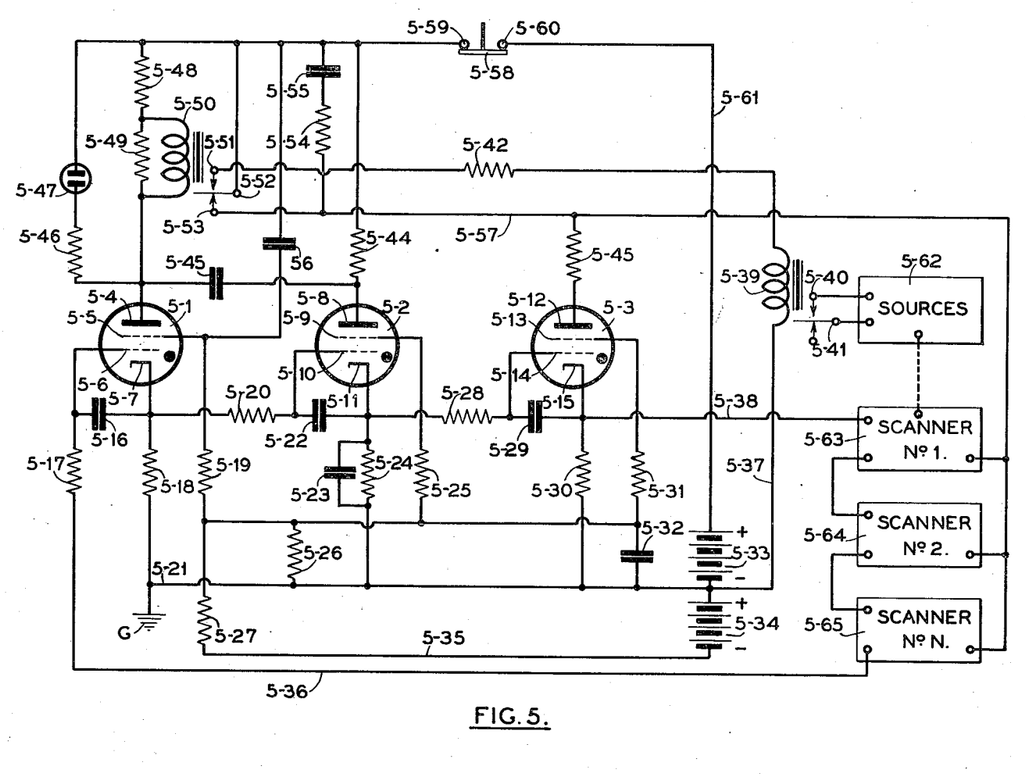
Fig. 5 shows a diagram partly in block diagram with circuit details of the time delay and reset of a typical electronic totalizing system according to the present invention.

Fig. 5 shows one form of time delay and reset circuit particularly adapted to use in the combinations of the present invention. This unit has several important functions which are performed by its three thyratrons and two relays. One relay removes the high voltage from the scanners thereby resetting them. The other relay closes a circuit to the source for performing any required operations at that point. The thyratrons actuate the relays, introduce a time delay to allow various functions to be performed in other parts of the circuit and generate a pulse to restart the scanning by the scanners.

Specifically Fig. 5 shows three thyratrons 5—1, 5—2 and 5—3 having cathodes 5—7, 5—11 and 5—15, control electrodes 5—6, 5—10 and 5—14, grids 5—5, 5—9 and 5—13 and plates 5—4, 5—8 and 5—12 respectively. The final scanner 5—65 in the series 5—63, 5—64 and 5—65 sends out a pulse over lead 5—36 through resistor 5—17 and across condenser 5—16 for providing a time delay to control electrode 5—6 of first thyratron 5—1. The delayed pulse causes thyratron 5—1 to fire and the resulting plate current thru resistor 5—48 and relay coil 5—50 shunted by resistor 5—49 from voltage source 5—33 over lead 5—61 closes relay contacts 5—52 to 5—51 and opens relay contacts 5—52 to 5—53. The closing of contacts 5—52 and 5—51 energizes relay 5—39 from voltage source 5—33 through resistor 5—42 and leads 5—61 and 5—37 thereby closing contacts 5—40 and 5—41 to perform any required functions in source 5—62. The opening of contacts 5—52 and 5—53 removes voltage from source 5—33 to scanners 5—63, 5—64 and 5—65 over lead 5—57 and thereby resetting these scanners in readiness for the next scanning sequence. A suppressor for preventing arcing of these last contacts when opening may be provided in resistor 5—54 in series with capacitor 5—55 connected between leads 5—61 and 5—57 and hence across the contacts. An indicator in the form of neon lamp 5—47 in series with resistor 5—46 connected across resistor 5—48 and relay coil 5—50 may be provided to show when thyratron 5—1 is in fired condition.

Bias to grids 5—5, 5—9 and 5—13 may be provided in any suitable manner as, for instance, from battery 5—34 over lead 5—35 through resistor 5—27 across resistor 5—26 and through resistors 5—19, 5—25 and 5—31 respectively. When thyratron 5—1 fires it generates a pulse across its cathode resistor 5—18 which is applied through a time delay circuit consisting of resistor 5—20 in series and capacitor 5—22 in shunt to control electrode 5—10 of thyratron 5—2. This pulse causes thyratron 5—2 to fire and the resulting plate pulse across resistor 5—44 is applied back through capacitor 5—45 to plate 5—4 extinguishing thyratron 5—1. When thyratron 5—1 extinguishes, relay coil 5—50 is deenergized and contacts 5—52 and 5—53 are again closed resupplying voltage to the scanners so that they are again ready to function. Contacts 5—52 and 5—51 opening at the same time deenergize relay coil 5—39 opening contacts 5—41 and 5—40. When thyratron 5—2 fires it generates a pulse across its cathode resistor 5—24 shunted by capacitor 5—23 which is applied through a time delay circuit consisting of series resistor 5—28 and shunt capacitor 5—29 to control electrode 5—14 which causes thyratron 5—3 to fire. When thyratron 5—3 fires, it generates a pulse across its cathode resistor 5—30 which is applied to the first scanner 5—63 over lead 5—38 to restart the scanning sequence. Current to plate 5—12 is limited by resistor 5—43.

In addition to the operations just described there are auxiliary events which take place. When the signal has passed through the time delay and reset unit thyratron 5—1 is off ready to receive a pulse from the last scanner 5—65 while thyratron 5—2 and 5—3 are ignited. Thyratron 5—2 is turned off when thyratron 5—1 ignites due to a pulse from plate 5—4 which is coupled to plate 5—8 by means of capacitor 5—45. Thyratron 5—3 goes off when its plate voltage is removed by the opening of contacts 5—52 and 5—53. Furthermore, a starting switch 5—58 completing a circuit from contact 5—59 to 5—60 in lead 5—61 is provided. When switch 5—58 is opened all three thyratrons 5—1, 5—2 and 5—3 are killed and when it is closed a pulse passes through capacitor 5—56 to grid 5—5 igniting thyratron 5—1 and starting the sequence described above. Since switch 5—58 also controls the voltage to the scanners over lead 5—57 this starting operation kills any scanning which may be in progress shifting the entire sequence back to the starting point at thyratron 5—1.

While only one form of the present invention has been specifically shown and described, many modifications will be apparent to those skilled in the art within the spirit and scope of the invention as set forth in the appended claims.

What is claimed is:

1. In a totalizing device, the combination of, a plurality of sources of multiple denomination items to be totalized, a scanner for detecting items in each of said sources, a pulse generator for generating pulses to represent each of said denominations, couplings between said scanners and said pulse generator to initiate pulses when said scanners detect items in said sources, a plurality of adders, a gate to apply said pulses to predetermined adders, and couplings between said sources and said gate to actuate said gate.

2. In a totalizing device, the combination of, a plurality of sources of multiple denomination items to be totalized, a scanner for detecting predetermined conditions in said sources, a pulse generator for generating discrete groups of pulses for representing each of said denominations, coupling between scanners and said pulse generator for initiating pulses when said conditions pertain in said sources, a plurality of adders for totalizing said items in accordance with their respective denominations, a gate for controlling the application of said pulses to said adders, and coupling between said gate and said sources for actuating said gate in accordance with said conditions in said sources.

3. In a totalizing device, the combination of, a plurality of sources of multiple denomination items to be selectively totalized, a plurality of series connected scanners for detecting a predetermined condition in said sources, pulse generators for generating predetermined numbers of pulses for representing each of said denominations, gating means for directing said pulses to said adders, and means for coupling said gating means to said sources to actuate said gating means in accordance with said conditions in said sources.

4. In a device of the class described, the combination of, a plurality of sources of at least two denominations, a scanner for each of said sources responsive to a predetermined condition of said sources for activating a pulse generator, means for connecting said scanners in cascade for stopping the scanning upon a failure of one of said scanners, and means for receiving and registering pulses from said pulse generator.

5. In a device of the class described, the combination of, a plurality of sources, scanners for detecting predetermined conditions in said sources, means for generating pulses in response to said detection, a plurality of adders, gates for distributing said pulses to said adders, and acknowledgement means dependent upon coincidence of operative conditions in at least one of said scanners and in said pulse generator said pulse generator condition passing at least one of said gates.

6. In a device of the class described the combination of, a plurality of sources, a plurality of scanners for detecting conditions in said sources to be totalized coupled to said sources, at least one dual pulse generator coupled to said scanners for generating at least two predetermined numbers of pulses, at least two denomination adders and one total adder for totalizing the conditions in said sources, and gating means connected between said pulse generator and said adders and coupled to said sources for distributing pulses from said pulse generator in a predetermined manner.

7. In a device of the class described the combination of, a plurality of sources of one denomination and a plurality of features, an electronic adding device for each of said features, an electronic scanning device for each of said sources for detecting operative conditions in said sources, means for coupling said scanners to an electronic pulse generator for generating a number of pulses representing said denomination, an electronic counter for each of said features, and an electronic gate coupled to said sources, to said pulse generator and to said counters for directing said pulses to the counter corresponding to a given source.

NATHAN A. MOERMAN.

REFERENCES CITED

The following references are of record in the file of this patent:

UNITED STATES PATENTS

| Number | Name | Date |
|---|---|---|
| 2,354,768 | Nokes | Aug. 1, 1944 |
| 2,401,621 | Desch | June 4, 1946 |
| 2,403,873 | Mumma | June 9, 1946 |
| 2,404,697 | Desch | July 23, 1946 |
| 2,422,698 | Miller | June 24, 1947 |

FOREIGN PATENTS

| Number | Country | Date |
|---|---|---|
| 357,532 | Great Britain | Sept. 14, 1931 |

OTHER REFERENCES

Electronic Industries for July 1946, page 66, Fig. 7.